United States Patent [19]

Hwang

[11] Patent Number: 4,619,715
[45] Date of Patent: Oct. 28, 1986

[54] FUSIBLE POWDERED METAL PASTE
[75] Inventor: Jennie S. Hwang, Pepper Pike, Ohio
[73] Assignee: SCM Corporation, New York, N.Y.
[21] Appl. No.: 806,779
[22] Filed: Dec. 9, 1985

Related U.S. Application Data

[63] Continuation-in-part of Ser. No. 649,493, Sep. 11, 1984, Pat. No. 4,557,767, which is a continuation-in-part of Ser. No. 546,794, Oct. 31, 1983, abandoned.

[51] Int. Cl.$^4$ ............................................. B23R 35/34
[52] U.S. Cl. ...................................... 148/23; 148/24; 148/25; 148/26
[58] Field of Search ..................................... 148/23, 24

[56] References Cited

U.S. PATENT DOCUMENTS

| | | | |
|---|---|---|---|
| 592,914 | 11/1897 | Knox | 148/23 |
| 608,973 | 8/1898 | Burnley | 148/25 |
| 804,664 | 11/1905 | Leisel | 148/24 |
| 851,813 | 4/1907 | Lanigan | 148/25 |
| 1,004,847 | 10/1911 | Brach | 148/24 |
| 1,772,952 | 8/1930 | Knoth | 148/24 |
| 2,330,904 | 10/1943 | Miller | 148/23 |
| 2,493,372 | 1/1950 | Williams | 148/24 |
| 3,065,538 | 11/1962 | Melchiors et al. | 148/24 |
| 3,073,270 | 1/1963 | Johnson et al. | 148/24 |
| 3,925,112 | 12/1975 | Petersen et al. | 148/25 |
| 3,954,494 | 5/1976 | Stayner et al. | 106/270 |
| 4,180,616 | 12/1979 | Lovering et al. | 148/24 |
| 4,273,593 | 6/1981 | Mastrangelo | 148/24 |
| 4,460,414 | 7/1984 | Hwang | 148/23 |

Primary Examiner—Veronica O'Keefe
Attorney, Agent, or Firm—R. A. Sturges

[57] ABSTRACT

There is provided an inorganic salt-free, anhydrous, noncorrosive powdered solder metal paste and vehicle therefor which vehicle is characterized by the presence therein of a nonaqueous resinous binder and a nonaqueous organic liquid composition having a surface tension or surface energy of from 43 to 65 dynes/cm. and higher at 20° C. When powdered solder metal or powdered solder metal alloy is distributed in such a vehicle in an amount sufficient to form a paste, a deposit will not undergo hot slump at elevated temperatures. The pastes and vehicles are free of inorganic metal salts.

38 Claims, No Drawings

FUSIBLE POWDERED METAL PASTE

RELATED APPLICATION

This application is a continuation-in-part of my application Ser. No.: 649,493 filed Sept. 11, 1984 now U.S. Pat. No.: 4,557,767 dated Dec. 10, 1985 which was in turn a continuation-in-part of my application Ser. No.: 546,794 filed Oct. 31, 1983, now abandoned.

This invention relates to a paste vehicle and a heat-fusible metal powder paste. The vehicle is especially useful for making noncorrosive metalliferous pastes for joining by soft soldering.

BACKGROUND OF THE INVENTION AND PRIOR ART

The joining or coating, using a fusible soft solder metal powder-containing paste can be done efficiently, provided, however, that upon heating and before fusion of the metal, the soft solder metal powder containing paste exhibits controlled hot slump; in other words, the metal powder stays substantially where and as the paste was deposited on the substrate. This primary property has been difficult to obtain with conventional metal powder-containing pastes. The instant vehicles and pastes provide such property.

Restriction of flow of any resulting fused metal (that is a lack of general spreading), except into intended joints or to form intended joints as in the joining of electronic components to printed circuit boards or hybrid circuit board to avoid bridging in surface mounted device attachments, are other properties desired. The inventive products here can also provide desired restriction of metal flow on remelting. For most electronic soldering purposes at this time, the composition must be free of corrosive agents such as inorganic salts.

Soft solder pastes, for example, (melting below 400° C., preferably below 330° C.) usually contain tin and lead; a little silver often is alloyed with the tin, particularly for electronic work, e.g., for making microelectronic connections. Soft solder pastes now are experiencing wider acceptance in industry, primarily because pastes are more readily adapted to automated manufacture and screen printing on a substrate than are the more conventional and manually effected solder bar, separate flux and iron, or solder wire (e.g., one containing the flux in a core within the wire) and an iron. The make-up of prior powder metal-containing paste compositions has been largely influenced by the prior practices particularly in respect of fluxing or surface preparing agents. These have comprised substantial portions of organic acids, e.g., rosin acid, inorganic salt materials, e.g., zinc chloride, ammonium chloride, borax and the like, and rosin-based fluxex.

These soft solder compositions have not been entirely satisfactory in a number of respects. First, because of the presence of inorganic salt fluxes they have tended to be corrosive to the base metal or to introduce water as water of hydration leading to spattering. This problem was alleviated to a great extent with rosin-based flux vehicles. However the rosin-based fluxes or vehicles permit excessive movement of the solder particles away from the deposition site on heating; they also often give rise to sputtering and "dewetting" which leaves a residue as a halo around the solder joint. Their solder pastes have been prone to excessive solder balling, i.e., the formation of discrete minute balls of soft solder. This is highly undesirable and leads to electrical bridging across what should be electrically isolated connections especially on printed circuit boards.

In the preferred embodiment of a soft solder composition an alkali solubilized in a polyhydric alcohol, e.g., glycerine, acts as a fluxing agent and improves solderability. For best results herein, in a soft solder metal powder, a slump control system and an inorganic salt-free fluxing system are present. The compositions hereof are practically noncorrosive and easy to formulate and handle. They are readily adaptable to screen printing. Disadvantages attendant prior compositions, such as spattering due to evolution of water vapor, solder balling and bridging, corrosivity, dewetting, tenacious residue, failure of the solder to melt due to excessive oxidation, etc., are not observed in the metal-bearing pastes here. "Inorganic metal salts" are metal or ammonium salts of inorganic acids Lange's "Handbook of Chemistry", 10th Edition, pp. 209-333.

To better understand the applications of solder pastes, reference may be had to "Technology of Electronic Grade Solder Pastes" Taylor et al, Solid State Technology, September 1981, pages 127-135.

One prior paste composition is disclosed by Knoth U.S. Pat. No. 1,772,952. This paste comprises a solder metal powder, an amine and a binder or vehicle such as vaseline. These compositions do not, however, possess antislump properties which are currently in demand in the electronics industry. U.S. Pat. No. 2,493,372 to Williams dated Jan. 3, 1950 discloses a paste composition including a metal powder, e.g., tin-lead, a salt flux, and a C, H and O compound. Reference may also be had to U.S. Pat. No. 3,954,494 dated May 4, 1976 which discloses a wax-flux composition. U.S. Pat. No. 804,664 also shows a tin-lead metal powder paste in a vaseline—glycerine—inorganic salt flux system.

Another solder paste composition comprising powdered solder, a resin, a salt of an amino acid ester and a solvent is discussed by Melchiors et al in U.S. Pat. No. 3,065,538 dated Nov. 27, 1962.

Another aqueous base solder composition is shown by Johnson in U.S. Pat. No.: 3,073,270 dated Jan. 15, 1963.

Also exemplary of prior solder paste compositions is the U.S. Pat. No. 3,925,112 to Petersen et al dated Dec. 9, 1975. According this invention, there are provided emulsified self-cleaning soldering fluxes having an aqueous phase including from 2 to 30 pbw (parts by weight) of a water soluble hydrazine salt and an oil phase including from 5 to 50 parts of a mixture of petrolatum and wax. Also provided are water solutions of 2 to 30 pbw of the water soluble hydrazine salt, up to 5 parts of a vegetable gum thickener, a wetting agent and the balance water.

Another prior paste composition is disclosed by Mastrangelo in U.S. Pat. No. 4,273,593 dated June 16, 1981. This paste comprises a solder metal powder and a vehicle, the latter being a hydroxypropyl cellulose blended with glycerine and/or water and further blended with a mixture of polyalkoxyalkanols.

It has now been found that an improved vehicle for the instant powdered metal solder pastes is provided as an essentially inorganic salt free nonaqueous vehicle medium comprising a normally liquid nonaqueous organic liquid composition as an antislump agent, usually and preferably including a polyhydric alcohol system, characterized in that the liquid has a minimum surface tension of 43 dynes/cm (20° C.), and generally from 43 to 65 or higher dynes/cm. Such vehicle system provides a slump control property to the metal bearing paste such that when it is heated toward the melting point of the soft solder metal powder, e.g., 118° C. to 325° C., the shape of the deposit is substantially maintained until the metal fuses. Although as will be seen from Table I below, a nonaqueous liquid having a surface tension above 43 dynes/cm. may be used in the vehicles hereof, polyols are the most practical antislump materials and the invention will be described with reference to polyols for convenience.

These vehicles also desirably include a low surface energy material such as a nonhydrocarbon binder material which contains carbon, hydrogen and oxygen. The binder, which is preferably solid or semi-solid (e.g., grease-like) desirably melts, of course, and wets the substrate around the deposit, but carries no significant amount of the metal particles with it. Although binders having melting points above 15° C. are preferred, in certain embodiments normally liquid hydrocarbons such as hexane, cyclohexane, toluene or mixtures thereof, e.g., mineral spirits, may also be included in the vehicles hereof. The high surface energy material serves as a binder under heat conditions to hold the particles in position. Also the nonhydrocarbon binder is easily cleaned, along with any residue that may be left, away from the joint or surrounding area. The nonhydrocarbon binder by itself is incapable of imparting slump control properties to a powdered metal contained therein. In the preferred powdered metal compositions especially adapted for screen printing, no dewetting is observed. Surprisingly, even after melting, the fusible metal resists running from the site of application. Of course, in soft solder compositions there is also need for a fluxing agent. Such agent serves to clean the surfaces of the substrate of joining metal as well as the solder particles, and to inhibit the formation of oxide coating on the solder particles as the temperature is elevated toward melting.

The desirable properties of antislump, anticorrosion and freedom from spattering in the metal-bearing pastes here are not observed in prior compositions known to me. Other additives may desirably be present as will be pointed out below. The instant pastes have no water in them other than insignificant amounts possibly present as as adventitious impurity that might be associated with good quality technical grade ingredients. No water is added deliberately as such or as a hydrate; so it can be said that the instant pastes and vehicles are "nonaqueous" as a practical matter. Also, it has been found that the high surface tension liquid, e.g., a polyol, can be a single component vehicle or a part of a multicomponent vehicle, i.e., including also a nonhydrocarbon binder. The substrate on which the paste is deposited has no significant effect on the hot slump resistance.

BRIEF STATEMENT OF THE INVENTION

Briefly stated, the present invention is a nonaqueous or anhydrous inorganic salt-free, powdered solder metal paste composition comprising a major amount of a soft solder metal powder and a minor amount of a paste vehicle containing a noncorrosive anhydrous fluxing agent, and an antislump composition comprising a nonaqueous liquid composition having a surface tension above 43 dynes/cm. at 20° C., preferably a polyol containing from 2 to 6 hydroxyl groups and having a surface energy of from 43 to 65 or higher dynes/cm. (20° C.). Preferably these pastes also include a paste forming vehicle ingredient which is a nonhydrocarbon binder. It has been found to be advantageous as to antislump if the surface energy of the entire liquid vehicle system is above 43 dynes/cm.

To further extend the utility of the soft solder alloys, there may be added other ingredients, such as, one or more surfactants, one or more condensed or fused ring aliphatic acids, e.g., cholic acid or abietic acid or rosin acids, and one or more plasticizers such as di-n-butyl phthalate. The pastes including a powdered soft solder alloy from a shiny and coherent (i.e., coalesced) solder pool in a controlled area of application.

DETAILED DESCRIPTION OF THE INVENTION

It has been found that slumping of a paste composition containing a major amount of a powdered soft solder metal or soft solder metal alloy can be effectively controlled by a unique composition composed of a nonhydrocarbon binder or a mixture of nonhydrocarbon binders, e.g., rosin or rosin derivative, dimer rosin, etc., thermoplastic resins, e.g., polyvinyl alcohol, polyvinyl acetate, etc., and a polyhydric material, e.g., a glycerine and sodium hydroxide. The combination of a nonhydrocarbon binder having a melting point of at least 15° C. and less than the melting point of the metal, and a polyhydric alcohol, such as a di- of triethanolamine, or glycerine, or pentaerythritol, or the like, is however, effective in maintaining quite substantially the profile of the paste as it was initially deposited on the surface or substrate. A solder paste requires, however, a flux. At the fusion point, the metal in the present compositions has not run or spattered or balled up into small discrete balls of molten metal prior to the fusion of the entire mass. A polyhydric alcohol or polyol alone also is capable of conferring this property upon a paste composition containing a major amount of a metal or a metal alloy. However, the composition is unsatisfactory as a soft solder composition, requiring also a suitable binder with or without a hydrocarbon diluent and a noncorrosive or organic flux.

To form a solder paste, the vehicle portions hereof are blended with a powdered solder alloy to the extent of from 75% to about 95% metal by weight of the paste, and desirably from 80% to 90% and preferably about 85% powdered metal. The particle size of the powdered metal is desirably such that it will not settle out of the vehicle which is quite viscous (20,000 to 200,000 cps., Brookfield No. 7 spindle at 20 rpm) on standing. In general, the particle size is less than 100 mesh (U.S. Standard Sieve Size), desirably −200 +400 mesh. A mixture of various sizes and/or shapes of metal powders often is advantageous for achieving desired rheology and other paste properties in these applications. Solder powder particles are available in two forms, i.e., those having irregular shape and those having spherical shape. Either shape, or a mixture thereof may be used, although the spherical shape is desired. Where normally liquid hydrocarbon diluents are used, e.g., toluene, the particle size of the solder powder should be less than about 10 microns in order to minimize settling.

Preparation of the vehicle and paste is achieved with conventional stirring or blending means. Warming can be done, if necessary or desired, to facilitate by dissolving or melting ingredients together for putting them into very intimately dispersed condition and/or otherwise making a multiphase dispersion with the ingredients in a very fine state of subdivision preparatory to blending with the metalliferous powder to form a mass of paste consistency. Preferred compositions include additional fluxing agents, optionally a surfactant, optionally an organic carboxylic acid, and optionally a diluent, i.e., a plasticizer and/or solvent. Each of these ingredients will be discussed below. Thereafter, the solder alloys will be discussed followed by general processing techniques, and specific examples.

THE NONHYDROCARBON BINDER INGREDIENT

Nonhydrocarbon binders are preferred ingredients for the metal paste compositions thereof. The useful materials range in melting point from below about room temperature to normally solid materials, e.g., containing from 18 to 60 or more carbons and melting in range of 28° C. to 100° C. The useful binders also have a very low as or solid residue content and either melt and flow, sublime and/or thermally decompose at a temperature below the melting point of the solder (i.e., below 330° C.). The amount of ash or solid residue from the binder remaining of the melt temperature should be less than 0.5% and preferably less than 0.1%.

In my prior application Ser. No.: 649,493, supra, I disclosed various hydrocarbon binders, especially petrolatum, as the preferred binder in the solder paste vehicles. It has now been found that other organic media are also effective in the practice of the basic invention, i.e., preventing slump of a powdered solder paste during heating to a temperature sufficient to melt the solder by the use of a vehicle system having a surface energy within a limited range, e.g., 43 to 65 dynes/cm at 20° C. and higher. These organic media are compounds of carbon, hydrogen and oxygen, with or without other heteroatoms present. They are desirably solid or semi-solid at 15° to 30° C. or easily so rendered by the use of solvents or diluents such as those disclosed in my prior application and which melt and flow with the other vehicle ingredients at a temperature below the melting point of the solder alloy. Said application has issued after the filing of this application into U.S. Pat. No. 4,557,767 dated Dec. 10, 1985. This patent is incorporated herein by reference.

A particularly useful subgroup of these binders consists of rosin and its derivatives. The rosin may be wood rosin, gum rosin or tall oil rosin. A tall oil rosin binder is the preferred mode of carrying out this invention. Other rosin derivatives may be used to replace part or all of the tall oil rosin binder.

Tall rosins resulting from tall oil processing operations consists mainly of resin acids—fused triple-ring polycyclic tertiary monocarboxylic acids—typified by abietic acid. Other resin acids found in tall oil rosin include levopimaric acid, neo-abietic acid, dehydroabietic acid, dihydroabietic acid, tetrahydroabietic acid, pimaric acid, isopimaric acid, and palustric acid with very minor amounts of other related acids also being present. For present purposes tall oil rosin can include any of the various resin acids typical of tall oil rosin though preferably a mixture of such resin acids as is normally found in tall oil rosin resulting from tall oil processing operations is used to form the novel resinous mixture of the present invention. Other rosins useful in the present invention include gum rosin and derivatives thereof, wood rosin and derivatives thereof, or even mixtures of rosins if desired.

Rosin polymer is composed mainly of dimer resin acid with lesser quantities of higher polymeric resin acids also being present. Rosin polymer can be made by subjecting rosin (tall oil, wood, gum or mixtures thereof) to a (cationic) polymerization process in the presence of suitable acid catalysts such as, for example, zinc chloride, tin chloride, boron trifluoride and various boron trifluoride complexes, sulfuric acid, and the like conventional rosin rosin polymerization catalysts. Generally, about 0.1% to 0.2% catalyst by weight of the rosin is used in conventional rosin polymerization process. Temperatures for the polymerization process normally range from about 100° C. to about 200° C. Bleaching of the rosin can be practiced as is necessary, desirable, or convenient in conventional fashion.

An unsaturated carboxylic acid compound is grafted or reacted onto the rosin. Preferably, the carboxlyic acid is alpha-beta-ethylenically unsaturated for grafting onto the rosin by reaction with the unsaturation contained in the resin acid found in the rosin. Additionally, one may conduct a conventional Diels-Alder reaction for grafting an unsaturated carboxylic acid onto the rosin. The precise nature of the graft of the ionizable compound onto the rosin need not be precisely characterized as it is necessary only that the grafting acid be chemically united with the rosin for purposes of the present invention. Representative acids include, for example, fumaric acid and its half ester, maleic acid (including maleic anhydride) and its half ester, maleic acic (including maleic anhydride) and its half ester, acrylic acid, methacrylic acid and related alkyl and aryl acrylic acids, itaconic acid (and anhydride), and oligomers and copolymers of acrylics and vinyls with ethylenically unsaturated acids (e.g., styrene/acrylic acid copolymers, etc.).

Alcohols for forming a carboxylic ester attached to the rosin are monoalcohols or polyhydric alcohols of $C_1$-$C_{18}$ chain length and preferably a $C_6$-$C_{10}$ chain length, including hydroxyl bearing equivalents such as a mono-epoxide or the like. Representative monoalcohols include, for example, butanol, hexanol, octanol, decanol, cyclohexanol, optionally with $C_1$-$C_4$ substitution, e.g., 2-ethylhexanol, and the like and mixtures thereof. A presently preferred alcohol for such ester group formation is methanol.

In forming the carboxylic acid ester-modified rosin, the acid may be grafted onto the rosin followed by the addition of the mono-ol to form ester groups; the preformed ester of the grafting-acid, and mono-ol reacted together to in situ form the acid graft and ester; or the mono-ol can be added to the rosin followed by the addition of the grafting acid. It should be noted that the ester may be formed from the acid grafted onto the rosin; from the carboxy group of the rosin, or combinations thereof. Of course one skilled in the art will appreciate that there are numerous modifications to the foregoing reaction procedures which are included within the spirit of this invention.

Broadly, the resinous mixture can be made from 40-85% rosin, 5-20% grafting acid, 10-30% monoalcohol, 10-30% polyol. Preferred proportions presently are about 65% rosin, 10% grafting acid, 20% mono-alcohol, and 5% polyol (e.g., a glycol). Typically, about 1-2 equivalents of acid functionality (rosin and grafting acid) per 0.5-1.5% equivalents of hydroxyl functionality is used in making the novel resinous mixture. The precise proportions of a grafting acid and mono-ol used to modify the rosin are adjusted so that the ionizable resinous mixture has a softening point of less than about 125° C., advantageously about −25° to 125° C., and preferably about 0°–50° C.; and acid number (A.N.) of between about 30 and 150 and preferably between about 50 and 80. The particular type of rosin, grafting acid, and alcohol will determine their individual proportions for producing the product as defined herein. Also, the novel ionizable resinous mixture can be admixed with various other modified rosins, such as, for example, rosin grafted with various acrylic or vinyl monomers, oligomers, or copolymers; rosin grafted with a carboxylic acid ester of other mono-ols, polyols, polyepoxides, or the like; hydrocarbon resins; rosin; rosin esters; phenolic modified rosin derivatives; hydrogenated rosin derivatives; disproportionated rosin derivatives; poly-terpene resins; and the like and mixtures thereof.

Specific examples of rosin or rosin derivatives useful herein include any of the rosins, e.g., wood, gum, or tall oil rosin and derivatives thereof; rosin esters of the foregoing monohydric and polyhydric alcohols, hydrogenated and/or partially hydrogenated rosin and hydrogenated and/or partially hydrogenated rosin esters of the foregoing monohydric and polyhydric alcohols, polymerized rosin, e.g., dimeric rosin and esters thereof, e.g., glyceryl esters, pentaerythritol esters, etc., phenol rosin ester, formaldehyde-rosin reaction product, and the like.

Another particularly useful subgroup of these binders are the homopolymers and heterpolymers, e.g., copolymers and terpolymers of vinyl halides, e.g., vinyl chloride, vinyl alcohol, vinyl acetate, vinyl butyrate, polyvinyl acetals, copolymers of such vinyl monomers with vinylidene chloride, methacrylic acid, acrylic acid, styrene, etc., copolymers of vinylidene chloride with vinyl chloride, copolymers of vinylidene chloride with acrylonitrile, acrylamide, etc.

Another useful subgroup of these binders comprises the thermoplastic polyacrylates and polymethylmethacrylates. Polymers of acrylates of primary aliphatic alcohols containing 4 to 12 carbon atoms are soft and pliable. Those of ring containing aromatic and aliphatic hydroxyl compounds are less pliable. These polymers are readily copolymerized with other monomers. Ethyl acrylate may be homopolymerized or copolymerized with another acrylate, e.g., 2-chloroethyl acrylate, forming a useful binder. Ethyl acrylate with styrene forms another useful binder.

Another useful subgroup of these binders comprises the acrylonitrile polymers and copolymers, e.g., with methacrylamide.

Polyesters such as polyethylene terephthalate may also be used as binders herein. Alkyl resins are of this class.

Of the esters, the ATLAC products, such as 711, specifically 711-05-A, and 382, obtainable from ICI of America; and of the epoxy resins "EPON" 828 of the Shell Chemical Company have been mainly used herein. The polyesters are generally preferred to be the unsaturated ones or to have present polymerizable unsaturated monomers such as styrene. Such may be selected from such U.S. Patents as U.S. Pat. Nos. 2,607,756; 2,705,836; 2,743,309; 2,819,248; 2,851,379; 3,018,267; 3,129,110; 3,217,066, 3,222,421; 3,227,665; 3,232,893; 3,331,796; and 3,551,378, among others. Those of Hooker Chemical Co. identified as "HETRON" brand polyesters, the "DERAKANE 510-40" brand polyesters of Dow Chemical Co. as well as polyesters from the Celanese, American Cyanamid, and Rohm & Haas Corporations may be used.

If unsaturation is present in the polyester, conventional promoters such as cobalt naphthenate and conventional catalysts, such as methyl ethyl ketone peroxide, are added. The promoter is usually in liquid form as a 6% solution and amounts up to about 4% of the total weight of the mixture being used. The solvent is usually an organic, volatile material and may be a polymerizable material, such as styrene. Usually, the solvent for the promoter and catalyst is dimethyl phthalate. Similarly, the peroxide, be it methyl ethyl ketone peroxide or benzoyl peroxide or any other similar compounds is readily blended in, generally, in amounts up to about 2.0% based on the total weight of the mixture. The polyester/vinyl monomer ratio is usually between 1/10 and 10/1 by weight.

The preferred epoxy resins are those prepared from bisphenols such as Bisphenol "A" and an epihalohydrin such as epichlorohydrin. The epoxy material may be selected from such polymers mentioned in Brenner et al *High-Temperature Plastics* (Reinhold Publishing Corporation (1962)).

Saturated polymers may be employed as, for example, alkyd resins, the polyesters made from polyhydric alcohols and polycarboxylic acids or anhydrides; polymers and copolymers of ethylene terephthalate, as, for example, poly(ethyleneterephthalate); polyamides from diamines such as hexamethylene diamine and adipic acid or from other polyamide forming ingredients, such as e-caprolactam, polyimides; polyhydrocarbons, as, for example, polyethylene and polypropylene; polyurethanes, as, for example, those made from toluene diisocyanate and polyhydric materials as glycols and alkoxylated pentaerythritol or sorbitol; polyhalo polymers, as, for example, polyvinyl chloride, polyvinyl fluoride or poly(tetrafluoroethylene) or copolymers of tetrafluoroethylene; the polyacrylics, among many others. Of the many polymers that can be beneficially modified by use of the retardant mixtures of this invention, the thermosetting resins are preferred.

Since there are many unsaturated monomers that are inexpensive, it is frequently desirable to use them in conjunction with other polymers, as the above mentioned unsaturated polyesters, effecting copolymerization. Such monomers are founds in U.S. Pat. Nos. 2,443,735; 2,407,479; 2,491,404; 2,931,784 and 3,210,441 and include the vinyl monomers such as vinyl acetate, vinyl chloride, and acrylonitrile, as well as the allyl monomers exemplified by allyl acetate and diallyl phthalate; the acids, as, for example, acrylic and maleic acid and methacrylic acid; aromatic monomers, such as styrene, divinyl benzene, and vinyl pyridine and esters as methyl acrylate, methyl methacrylate and diethyl fumarate. While such monomers can constitute up to 90% by weight of the shaped article usually amounts from about 30% to about 70% by weight are used, it being preferred to have present a performed polyester or epoxy resin in the curable composition.

Thus a great many classes of binders of the thermoplastic or thermosetting types containing carbon, hydrogen and oxygen and having melting points or decomposition points below that of the powdered solder metal alloy, e.g., below 400° C. may be used as the binder ingredient in the solder pastes of this invention. Often plasticizer materials may be required to develop the proper consistency of the solder paste. These plasticizers and their mode of use are well known to those skilled in the art.

The binder ingredient is utilized in an amount which ranges from 10 to 90 pbw of the vehicle system, or 0.7% to 22.5% of the solder paste. A nonaqueous organic liquid having a surface energy in the range of 43 to 65 or higher dynes/cm appears to be essential for the slump control characteristics of the present powdered metal pastes. Although water has a high surface energy as does sulfuric acid, these materials are not satisfactory because of spattering or reactivity at elevated temperatures.

SLUMP CONTROL SYSTEM

As indicate above, the ability of a soft solder paste to resist hot slump, or running during softening and melting is essential in modern microelectronic processing and particularly silk and stencil screening of soft solder pastes. It has been found that a combination of a nonhydrocarbon binder as above defined, and particularly rosin, and a nonaqueous organic liquid composition having a surface tension at 20° C. greater than 43 dynes/cm., and comprising preferably one or more polyhydric alcohols containing 2 to 6 OH groups and having a surface tension or energy of from 43 to 65 or higher dynes/cm at 20° C., is effective in providing a good paste and in preventing slumping of the metal particles. The binder alone with powdered soft solder composition appears incapable of conferring this property to any degree. Nonaqueous organic liquid alone gives sufficient antislump properties but sometimes insufficient soldering properties. Soft solder pastes also require a flux and to obtain the noncorrosiveness required in modern electronic applications the flux should not be an inorganic salt, e.g., $ZnCl_2$, $NH_4Cl$, or borax, this latter being highly hydrated and thus given to spattering. Although the nonhydrocarbon binders contribute little to the surface energy of the vehicle, the surface energy of the entire vehicle system is influential in conferring antislump properties on the solder paste compositions and accordingly the surface energy of the entire vehicle system should be less than 43 dynes/cm. at 20° C. and preferably between 43 and 65 dynes/cm. or higher.

The active antislump agents hereof are generally polar compounds.

Table I below gives specific examples of liquids of various kinds useful in inhibiting slump. The polyols useful herein are aliphatic and normally liquid or of relatively low melting point, i.e., below about 170° C. and include ethylene glycol, diethylene glycol, propylene glycol, dipropylene glycol, sorbitol, mannitol, trimethylolethane, trimethylolpropane, diethanolamine, triethanolamine, pentaerythritol, and erythritol. These polyols coact with a nonhydrocarbon, especially tall oil rosin in the absence of water and in the presence of a finely divided metal powder to control slumping on heating and to provide a satisfactory paste medium. A fluxing agent either as a separate ingredient, e.g., sodium hydroxide, or as a moiety of the polyol (e.g., triethanolamine or diethanolamine) must be present. The secondary or tertiary amine group appears to be suitable for fluxing. The polyol is generally insoluble in the binder. The amount of liquid polyol constitutes from about 0.5% to 10.0% by weight of the vehicle and powdered solder metal composition.

A comparative study of various agents in 88.9% powdered metal compositions demonstrates the significance of the limitation respecting surface energy or surface tension.

TABLE I

Slump/Resistance Study
(For 60% Sn; 40% Pb Powdered Metal)*

| Surface Tension Tenion | Antislump Agent | Slump Resistance | Remarks |
|---|---|---|---|
| 63.4 | 7% NaOH/93% Glycerine | Yes | Fluxing occurred. |
| 63.4 | Glycerine | Yes | No fluxing |
| 58.2 | Formamide | Yes | Little fluxing occurred |
| 55.1 | Conc $H_2SO_4$ | Yes | Oxidizing occurred |
| 50.8 | Methylene Iodide | Yes | P/M turned green |
| 48.4 | Triethanolamine | Yes | Fluxing occurred |
| 48.5 | Diethanolamine | Yes | Fluxing occurred |
| 48.3 | Monoethanolamine | Yes | |
| 47.7 | Ethylene Glycol | Yes | Little fluxing occurred |
| 45.2 | Triethylene Glycol | Yes | Little fluxing occurred |
| 44.0 | Tetraethylene Glycol | Yes | Little fluxing occurred |
| 44.5 | Polyethylene Glycol 200 | Yes | Little fluxing occurred |
| 44.5 | Polyethylene Glycol 600 | Yes | Little fluxing occurred |
| 42.9 | Aniline | No | |
| 40.9 | Phenol | No | Solid Chemical |
| 38.0 | Pyridine | No | |
| 36.8 | Nitromethane | No | |
| 32.7 | Acetic anhydride | No | Oxidizing occurred |
| 32.5 | Oleic acid | No | |
| 32.3 | Carbon Disulfide | No | |
| 27.8 | Acetic acid | No | Oxidizing occurred |
| 27.5 | n-Octyl alcohol | No | |
| 25.5 | Cyclohexane | No | |
| 24.2 | Ethyl bromide | No | |
| 23.0 | i-Butyl alcohol | No | |
| 20.7 | Vaseline | No | |

*NOTE:
1. Formula used for slump resistance studies: 88.9% (97.5% Pb; 1.0% Sn; 1.5% Ag) + 7.8% Rosin + 3.3% Antislump agent.
Paste was examined on Cu coupon at designated temperature.

Table II below shows the hot slump effect on a solder composition using the "antislump agent" as the sole vehicle.

TABLE II

Slump/Resistance Study
(For 60% Sn; 40% Pb/Single Phase Vehicle System)

| Surface Tension (Dyne/Cm) | Antislump Agent | Slump Resistance | Remarks |
|---|---|---|---|
| 63.4 | 7% NaOH/93% Glycerine | Yes | Excellent Soldering |
| 63.4 | Glycerine | Yes | |
| 55.1 | Conc $H_2SO_4$ | Yes | Oxidizing Occurred |
| 50.8 | $CH_2I_2$ | Yes | |
| 48.9 | Triethanolamine | Yes | |
| 47.7 | Ethylene Glycol | Yes | |
| 40.9 | Phenol | No | Solid Chemical |
| 38.0 | Pyridine | — | P/M ppt'd quickly |
| 27.5 | n-Octyl alcohol | — | P/M ppt'd quickly |
| — | Vaseline | No | |

Note:
1. Paste was examined on Cu coupon at 235° C.
2. The vehicle NaOH/glycerine also provided good slump resistance for Nordox Red Cuprous. ($Cu_2O$).

Table III below shows the effect of temperature on hot slump resistance with selected polyols and other additives.

TABLE III

Slump/Resistance Study (Temp. Effect)

| Surface Tension (Dyne/Cm) | Antislump Agent | Temp. (°C.) at Test | Slump Resistance |
|---|---|---|---|
| 48.9 | Triethanolamine | 150 | Yes |
|  |  | 235 | Yes |
|  |  | 325 | Yes |
| 44.5 | Polyethylene Glycol 200 | 150 | Yes |
|  |  | 235 | Yes |
|  |  | 325 | Yes |
| 42.9 | Aniline | 150 | No |
|  |  | 235 | No |
|  |  | 325 | No |
| 38.0 | Pyridine | 150 | No |
|  |  | 235 | No |
|  |  | 325 | No |

Note:
1. Formula used for slump resistance studies: 88.9% (97.5% Pb; 1.0% Sn; 1.5% Ag) + 7.8% Rosin + 3.3% Antislump agent.
Paste was examined on Cu coupon at designated temperature.
2. When the paste was examined on substrate which has been surface treated with FC-723* (surface tension 11 dyne/cm), the slump resistance behavior was still about the same as that on the Cu coupon.
*Fluorad FC-723 is an oleophilic, hydrophobic fluorocarbon in an inert vehicle having a specific gravity of 1.78 produced by 3M.

The antislump agents hereof may comprise a single compound such as glycerine, or a plurality of ingredients which are liquid or solid at ordinary temperatures. The agents, or composition of ingredients mainly responsible for conferring antislump properties generally have a surface energy within the desired range of 43 to 65 dynes/cm. at 20° C. apart from the binder portion of the vehicle. However, it is desirable from the standpoint of antislump characteristics of the solder paste, if the entire vehicle system including the binder and the antislump agent or agents has a surface energy in the range of 43 to 65 dynes/cm. at 20° C. or higher.

FLUXING SYSTEM

As indicated above, there must be present a noncorrosive anhydrous fluxing system in a solder paste composition hereof. The fluxing system may be a single chemical specie dissolved or dispersed in the binder/polyol system. Alternatively, the fluxing system may comprise a plurality of fluxing agents dissolved or dispersed in the binder/polyol system. Best results have been secured with alkali or basic reacting fluxing agents, and particularly alkali metal hydroxides. These can be used as solutions in the polyol or as alcoholates of a monohydric or polyhydric alcohol, e.g., methyl, ethyl or isopropyl alcohol, dissolved in the polyol, or the alkali metal salt of the polyol, e.g., sodium glycerate.

The alkali metal hydroxide in such component is a preferred noncorrosive fluxing agent and is effective in a proportion of about 0.1–5% by weight of the vehicle, and, advantageously, 0.25–3.5%. The liquid polyol can constitute from about 0.5 to 75.0% by weight of the vehicle, and, advantageously, about 40%. On the basis of the entire solder paste, the amount of polyol ranges from about 0.3 to 20.0%. The alkali metal hydroxides useful herein include in descending order of preference sodium hydroxide, potassium hydroxide, lithium hydroxide and cesium hydroxide. Such alkali metal hydroxides have a limited solubility in polyhydric alcohols or mixtures of same that are liquid and are conveniently used in concentrations at or near the limit of solubility, i.e., less than about 10% by weight of the polyol. As indicated, they can be present as an alkali metal alcoholate, e.g., sodium ethylate, dissolved or well dispersed in the polyol, the alcoholate being equivalent to the hydroxide. The polyhydric alcohols include glycerine (which is preferred), ethylene glycol, diethylene glycol, propylene glycol, sorbitol, mannitol, pentaerythritol, erythritol, etc., containing from 2 to 6 OH groups. A sodium hydroxide/glycerine solution is particularly effective and may be used as the sole fluxing agent, or it may be used in combination with an alkanolamine, e.g., triethanolamine or diethanolamine to provide effective fluxing systems for the instant pastes.

A useful fluxing ingredient is also provided as an amine component of the vehicle. Such component is effective in a broad proportion, e.g., about 2–40% by weight of the vehicle and, advantageously, 3–10%. The essential functional group of this component is an

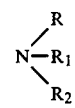

wherein R, $R_1$, and $R_2$ are independently selected from hydrogen, alkyl, alkylene, cycloalkyl, cycloalkylene, carboxyalkylene, aminoalkylene, hydroxyalkylene, carbonylalkyl, etc., no more than two of R, $R_1$ and $R_2$ being hydrogen. The alkyl and cycloalkyl groups may contain from 1 to 30 carbon atoms. The amine component may contain one to three amino groups. A particularly useful group of amine compounds is the water soluble alkanolamine group including mono-, di, and trimethanolamines, mono-, di-, and triethanolamines; mono-, di-, and tripropanolamines, and mixtures of the mono-, di, and trialkanolamines. Alkyl and cycloalkyl amines, particularly the $C_2$–$C_{18}$ mono and polyamines, e.g., triethylamine, tri-isopropylamine, diethylamine, mono-n-butyl amine, propylene diamine cyclohexylamine, cyclopropyl methylamine, tetramethylene diamine, rosin amine, cyclohexylamine hydrochloride, cyclohexylene amine, diaminoethylamine, diaminopropylamine, etc. Thus, the kind and configuration of the amino compounds useful herein are very broad and results among the examples are reasonably equivalent for fluxing. Amidino and guanidino fluxing agents, advantageously aliphatic ones, can be considered as useful amines for the instant purpose. Aromatic amines, while functional, often impart toxicity and therefore are not favored. Similarly, pyridine-type materials, such as, pyridine or a lutedine give off intensely objectionable odors and are not favored, could be considered functioning like amines here. The preferred amines are the alkanolamines. Also useful to supplement the base system are the amino acids, particularly the water soluble amino-acids, e.g., aminoacetic acid, beta-aminopropionic acid, (beta-alanine) aminobutyric acids, epsilon-aminocaproic, acid, N-methylglycine, betaine, alpha-delta-diaminovaleric aliphatic carboxylic acids. Thus, urea, propionamide, butanamide, 2,2-dimethylpropionamide, N-methylpropionamide, N,N-beta-trimethylbutyramide, steroylamide, etc., can be such base system supplements.

OTHER FLUXING AND/OR SOLDERABILITY INGREDIENTS

Organic carboxylic acids are useful as fluxing and/or solderability ingredients, particularly in a supplemental role in combination with the other ingredients described above. Any high boiling (above 300° C.) aliphatic carboxylic acid may be used. I prefer, however, to use condensed ring acids such as abietic acid, cholic acid, rosin acids, polymerized rosin acids, hydrogenated rosin acids rosin esters disproportionated rosin ester gum, wood rosin, gum rosin, tall oil rosin (when rosin or a rosin derivative such as above described is not the nonhydrocarbon binder), or fatty acids such as stearic acid, oleic acid, etc. Fatty amine and fatty acid compounds are also useful in this capacity. Examples include N-tallow-1,3-diaminopropane, 3-diaminopropane dioleate, etc. The acids are used in small amounts of from 0.5 to 10% by weight of the vehicle composition, or on the basis of the fully formulated solder paste, from about 0.03% to about 2.5%.

It has also been found that a surfactant may be advantageously included in the vehicles hereof. Although such surfactant or wetting agent may be anionic, cationic, amphoteric, or nonionic, nonionic agents are preferred. Many surfactant materials are known. They are used in the present vehicles to help to control the rheological properties, shelf-life stability, air voids, etc. The amount used is determined by cut and try and is that amount which is sufficient to impart the desired control. These agents assist in the dispersion of the powdered metal and in carrying the fluxing agent to the surfaces being joined or coated. Generally, less than 10% by weight each of other ingredients is used and usually from 0.01% to 5% by weight of the vehicle or 0.001% to about 4.5% of the solder paste.

Specific surfactants include the alkylarylpolyether alcohols, ammonium perfluorinated carboxylates, fluorinated alkyl esters of fatty acids, acetylenic glycols (which as sometimes can get as a defoamer), polyoxyethylene sorbitan monostearate, etc. Surfactants commonly used in solder pastes may be used herein.

Solvents and/or diluents may also be present in the vehicle compositions hereof. For example, when a paste containing powdered solder metal is to be used in a screen printing process, solvents are conveniently used to adjust the viscosity to a satisfactory level. Solvent materials are desirably volatile, at least at the melting point of the solder alloy. Any solvent including low molecular weight alcohols, e.g., ethyl or propyl, isopropyl, butyl, amyl, cyclohexyl, terpene alcohols, etc.; ketones, e.g., methyl ethyl ketone, methyl isobutyl ketone; 2-butoxyethanol-1, ethylene glycol dimethyl sulfoxide, hydrocarbons, e.g. kerosene, terpene hydrocarbons, hexane, cyclohexane, heptane, octane, naphthas such as mineral spirits, ethyl acetate, amyl acetate, etc. The solvent ingredients may also include higher boiling materials commonly regarded as plasticizers such as dibutyl phthalate, tricresyl phosphate, etc.

The selection of the solvent and/or diluent is controlled by the end use, cost, environmental factors, desired plasticity, etc. The solvent or diluent leaves the system after application to a substrate as in screen printing, the residue being the solder paste composition hereof.

Minor amounts of known odorants, bactericides, fungicides, etc., may also be included in the vehicles hereof if desired. Amounts of such ingredients usually range from about 0.1 to 2% by weight of the vehicle.

PREPARATION OF THE VEHICLES

The simplest preparation of the vehicles hereof involves only effective mechanical mixing of the ingredients into the binder ingredient, e.g., rosin or polyvinyl alcohol.

The binder can, if desired or necessary, be heated to melt it and facilitate the blending operation. Warming of some of the other ingredients also can be of help. It is not necessary that the mixture be a solution. The paste-like vehicle can be cloudy and contain one or more phases with the disperse phase fine enough so that it will not separate substantially on standing.

The materials discussed in detail above are considered to be ingredients of the vehicles hereof.

THE METAL POWDER

Solder compositions useful herein as the metal powder for blending with the above described vehicles to form a paste, or for extrusion of a hollow wire for making a cored solder wire, are well known. A number of representative compositions useful herein are given in the Taylor et al article, supra. In general the solder compositions have a melting point in the range of from about 118° C. to about 330° C. and comprise tin together with lead and/or silver. Other metals such as zinc, aluminum, bismuth, cadmium, nickel, indium and cadmium may also be used in the solder compositions.

For making a solder paste, the metal powder is comminuted so that it is easily and stably dispersed in the vehicle by grinding, ball milling, paddle blending, ribbon blender, etc. The entire powder should pass through a 50 mesh screen (U.S. Sieve Series) (297 microns). Typically, the powder is finer than 100 mesh (149 microns) because larger particles are difficult to disperse and maintain in suspension in the paste. A particle size in the range of $-200 +400$ mesh (U.S. Sieve Series) is preferred. Even smaller particles sizes, i.e., 10 microns or less are desired where normally liquid hydrocarbons are used in the vehicle as in silk screening paste compositions. For most purposes, from 3 to 20 parts by weight of solder metal powder is blending with 1 part by weight of vehicle. The paste compositions hereof generally will have a viscosity in the range of 20,000 cps to 200,000 cps. The preferred apparent viscosity will depend on the method of dispensing or application of the solder paste to the materials to be joined. Hand trowelling pastes are more satisfactory at the higher apparent viscosities than pastes intended for automatic dispensing such as extruding, flowing or spraying onto a substrate or those which are most suited for application to a substrate, e.g., a printed circuit, by a screen printed process. Viscosity can be controlled easily by the amount of solvent or solvent mixture and/or plasticizer employed in the vehicle, or by the vehicle to powder ratio. Pastes often are degassed at reduced pressure.

In fabricating cored solder wire, conventional procedures are used substituting a vehicle of the present invention for a conventional core composition such as a rosin based paste.

Effective control of hot slump in solder pastes is demonstrated by the following specific examples. These examples are intended to enable those skilled in the art to apply the principles of this invention in practical embodiments, but are not intended to limit the scope of the invention. In this specification all temperatures are in degrees Celsius unless otherwise expressly stated, and sieve sizes are for the U.S. Standard Sieve series.

Testing for resistance to hot slump of a solder paste was done by applying a deposit of the paste (about 5 mm diameter by 4-5 mm high) by spatula to a copper coupon, then gradually and automatically warming the coupon with a Browne Corporation reflow instrument (in effect an automated travelling hot plate) from room temperature to 330° in about a half-minute to a minute. The thus—heated deposit was observed visually for collapse of the metal prior to its fusing as the vehicle disappeared therefrom. Significant collapse of particulate metal of the deposit prior to its fusion would indicate hot slump. None of the exemplary pastes given below showed significant hot slump. In the case of solder paste the spreading of molten metal from the deposit area was also observed in the same test. None of the exemplary tin-containing solder pastes given below showed signficant spreading over the coupon; all had desirably restricted flow. Great spreading away from the locus of application is undesirable for many applications such as soldering in the manufacture of electronic devices.

In the following examples the following designations have the following indentities:

| Triton* N-60 = | alpha-(nonylphenyl)-omega-hydroxy-poly(oxy-1,2-ethanediyl), (Registry No.: 9016-45-9). *The trademark of Rohm & Haas Company. |
|---|---|
| Armeen* HT = | bis(hydrogenated tallow alkyl)amine, |
| Armeen* RC = | bis($C_{14}$-$C_{16}$ hydrocarbon alkyl)amine, |
| Duomeen* T = | N—tallow trimethylene diamine, and |
| Duomeen* TDO = | N—tallow trimethylene diamino dioleate, respectively. *The trademarks of Akzona, Inc. |
| PEG* 6000 DS = | alpha-(1-oxooctadecyl)-omega-[(1-oxo-octadecyl)oxy] poly(oxy-1,2-ethanediyl), (Reg. No.: 9005-08-07), |
| PEG* 6000 = | alpha-hydro-omega-hydroxy-poly(oxy-1,2-ethanediyl), Reg. No.: 25322-68-3, |
| Carbowax* 3350 = | a polyoxyethylenic wax, |
| n-Hexyl Carbitol* = | diethylene glycol mono n-hexy ether, and |
| Butyl Carbitol* = | diethylene glycol monobutyl ether, respectively. *The trademarks of Union Carbide Corp. |
| Fluorad* FC-340 = | a liquid fluorocarbon. *The trademark of 3M Company. |
| Surfynol* 104E = | 5-decyne-4,7-diol, 2,4,7,9-tetramethyl, Reg. No.: 126-86-3 *The trademark of Air Products and Chemicals, Inc. |
| Dowanol* DM = | 2-(2-methoxyethoxy)ethanol, (Reg. No. 111-77-3), and |
| DOWANOL* DE = | 2-(2-ethoxyethoxy)ethanol, (Reg. No. 111-90-0), respectively. *The trademarks of Dow Chemical Company |

Pastes tabulated below were made by blending the noncorrosive fluxing ingredients, metal powder and other solderability ingredients with binder in a molten condition, then blending in the other vehicle ingredients when the mass cooled to 32°. The specification for the solder powders was 5% max. ·+200 mesh, 4% max. −325 mesh. The formulations were evaluated according to standards established for electronic grade solder pastes. Accordingly, although some of the exemplified pastes may not have met all the electronic grade criteria, they were operative for other utilization such as for making a joint using a trowel to apply the paste. Of the exemplified solder pastes, those preferred for microelectronics work showed no solder balling.

In the solder tests no spattering was observed during heating to effect melting, and no significant hot slump or solder spreading was observed that is, they had good restriction of flow. Furthermore, there was no dewetting in evidence on the copper substrate, and cleaning of a joint easily could be had with a suitable organic solvent, e.g., a petroleum naphtha, alcohol, etc.

It is convenient to illustrate the present invention in the vehicles hereof by giving specific examples thereof. It will be understood that these examples are for illustrative purposes only. Those skilled in the art having knowledge now of the various nonhydrocarbon binders mentioned above and the specific examples below and in the aforesaid U.S. Pat. No. 4,557,767 will be enabled to compound many vehicles in accordance herewith. It is necessary only to substitute on a weight for weight basis the nonhydrocarbon binders disclosed herein for the hydrocarbon binders disclosed in said issued U.S. Patent.

A typical vehicle having antislump properties when compounded with a powdered soft solder metal alloy has a composition in accordance with the following general formula:

| Ingredient | Weight % |
|---|---|
| Picolinic Acid | 0–10 |
| Tall Oil Rosin | 15–60 |
| Butyl Carbitol | 0–20 |
| Glycerine | 5–55 |

A sample vehicle has the following composition

| Tall Oil Rosin | 40 |
|---|---|
| Glycerine | 40 |
| Butyl Carbitol | 20 |

The glycerine has a surface energy of 63.4 dynes/cm. at 20° C. and the surface energy of the above vehicle is between 43 and 65 dynes/cm. at 20° C. A powdered solder metal alloy may be mixed with the vehicles hereof in amounts generally ranging from 80% to 94% by weight, balance vehicle. In a typical example, a 62% tin, 36% lead, 2% silver solder alloy powder having a particle size in the range of −200 mesh (U.S. Standard Sieve Size) to +400 mesh in the amount of 85% by weight is thoroughly blended with 15% by weight the above sample vehicle.

The following are typical solder paste compositions which will or are expected to impart high flow restrictivity (generally maintaining original shape deposited no less than 90%).

| Ingredient | Weight % |
|---|---|
| Example I | |
| Rosin | |
| Tall Oil Rosin | 4.9 |
| Glutamic Acid | 0.6 |
| Butyl Carbitol | 5.7 |
| Triethanolamine | 1.2 |

-continued

| Ingredient | Weight % |
| --- | --- |
| Rheological Additive | 2.6 |
| Solder Powder | 85.0 |
| Example II $P_{VAc}$ | |
| Polyvinyl Acetate | 3–11 |
| Butyl Acetate | 1–3 |
| Dibutyl Phthalate | 0.7–2 |
| Glycerine | 0.4–10 |
| Rheological Additives | Balance to 15% |
| Solder Powder | 85.0 |
| EXAMPLE III Polyvinyl Acetal | |
| Polyvinyl Butyral | 1–6 |
| Butyl Acetate | 1–3 |
| Isopropyl Alcohol | 1–3 |
| Glycerine | 0.5–10 |
| Other Rheological Additives | Balance to 15% |
| Solder Powder | 85.0 |
| EXAMPLE IV Acrylic Polymer | |
| Acrylic Polymer | 3–8 |
| Ethyl Acetate | 3–10 |
| Triethanolamine | 0.5–10 |
| Other Rheological Additives | Balance to 15% |
| Solder Powder | 85.0 |

In each of the foregoing examples the specific antislump agents (e.g., listed in Table I) had surface tensions or energies within the range of 43 to 65 dynes/cm. at 20° C. as did the vehicles minus the solder powder ingredient.

What is claimed is:

1. An improved essentially nonaqueous noncorrosive inorganic salt free paste vehicle for soft solder metal powder, said vehicle comprising a nonhydrocarbon resinous binder in which is dispersed a nonaqueous organic liquid composition, said composition having a surface tension of from 43 to 65 or higher dynes/cm. at 20° C.

2. A vehicle as defined in claim 1 in which the vehicle also includes an organic anhydrous flux.

3. A nonaqueous noncorrosive inorganic salt free soft solder paste characterized by resistance to slumping during heating to the solder fusion point comprising:
   (a) from 75 to 95 weight parts per 100 parts of paste composition of a soft solder metal powder composition having a particle size of from −200 to +400 mesh (U.S. Standard Screen),
   (b) from 25 to 5 weight parts heat liquefiable nonhydrocarbon resinous binder composition ranging from semi-solid at room temperature to fugitive from the metal powder at the fusion temperature thereof, said binder composition including:
   (c) a nonaqueous organic liquid composition having a surface tension of from 43 to 65 dynes/cm. or higher at 20° C. dispersed in said binder, and,
   (d) an amount of a noncorrosive organic flux for said soft solder sufficient to form a shiny and coherent residue of solder upon melting and solidifying said powdered soft solder.

4. A vehicle as defined in claim 1 wherein the nonhydrocarbon resinous binder is a thermoplastic resinous binder having a melting point above 15° C. and below the melting point of the solder metal powder.

5. A vehicle as defined in claim 4 wherein the nonhydrocarbon resinous binder is selected from the group consisting of wood rosin and derivatives thereof, gum rosin and derivatives thereof and tall oil rosin and derivatives thereof.

6. A vehicle as defined in claim 5 wherein the nonhydrocarbon resinous binder is rosin.

7. A vehicle as defined in claim 5 wherein the nonhydrocarbon resinous binder is a rosin polymer.

8. A vehicle as defined in claim 5 wherein the nonhydrocarbon resinous binder is a rosin ester.

9. A vehicle as defined in claim 5 wherein the nonhydrocarbon resinous binder is a rosin glycerine ester.

10. A vehicle as defined in claim 5 wherein the nonhydrocarbon resinous binder is a hydrogenated or partially hydrogenated rosin.

11. A vehicle as defined in claim 5 wherein the nonhydrocarbon resinous binder is a hydrogenated or partially hydrogenated rosin ester.

12. A vehicle as defined in claim 5 wherein the nonhydrocarbon resinous binder is a polyester.

13. A vehicle as defined in claim 5 wherein the nonhydrocarbon resinous binder is a polyester of a dihydric alcohol and a dicarboxylic acid.

14. A vehicle as defined in claim 5 wherein the nonhydrocarbon resinous binder is a polyvinyl halide polymer or copolymer.

15. A vehicle as defined in claim 5 wherein the nonhydrocarbon resinous binder is a polyvinyl acetate or polyvinyl alcohol.

16. A vehicle as defined in claim 5 wherein the nonhydrocarbon resinous binder is a copolymer of polyvinyl chloride and polyvinyl acetate.

17. A vehicle as defined in claim 5 wherein the nonhydrocarbon resinous binder is an epoxy resin.

18. A vehicle as defined in claim 5 wherein the nonhydrocarbon resinous binder is an acrylic polymer or copolymer.

19. An improved essentially nonaqueous noncorrosive inorganic salt free paste vehicle for soft solder metal powder, said vehicle comprising a nonhydrocarbon resinous binder in which is dispersed in a proportion effective for diminishing hot slump of said metal powder when it is compounded with said vehicle, a base dispersed in a liquid polyol and an organic anhydrous flux, said vehicle having a surface tension of from 43 to 65 or higher dynes/cm. at 20° C.

20. A nonaqueous noncorrosive inorganic salt free powdered solf solder metal paste composition in accordance with claim 1 wherein the nonaqueous organic liquid composition includes triethanolamine.

21. A nonaqueous noncorrosive inorganic salt free powdered soft solder metal paste composition in accordance with claim 1 wherein the nonaqueous organic liquid composition includes diethanolamine.

22. The vehicle of claim 19 in which the base is sodium hydroxide in a proportion between about 0.05% and about 5% by weight of the vehicle.

23. The past of claim 1 comprising from about 75–95 parts of powdered tin-containing solder which melts below 330° C. and has a particle size not substantially larger than about 100 mesh.

24. The vehicle of claim 1 which consists essentially of rosin, a base and a polyol having a surface tension of from 43 to 65 or more dynes/cm. at 20° C. and is further characterized by the presence therein of a surfactant.

25. The vehicle of claim 1 which consists essentially of rosin, an alkali metal hydroxide and a polyol having a surface tension of from 43 to 65 or more dynes/cm. at 20° C. and is further characterized by the presence therein of plasticizer or diluent.

26. The vehicle of claim 1 wherein said nonaqueous organic liquid comprises glycerine.

27. A nonaqueous noncorrosive inorganic salt free soft solder paste as defined in claim 2 wherein the flux is a basic reacting flux.

28. A nonaqueous noncorrosive inorganic salt free soft solder paste as defined in claim 27 wherein the basic reacting flux is an amine.

29. A nonaqueous noncorrosive inorganic salt free soft solder paste as defined in claim 28 wherein the amine is trialkylamine in which the alkyl group is selected from the same or different alkyl groups containing from 2 to 6 carbon atoms.

30. A nonaqueous noncorrosive inorganic salt free soft solder paste as defined in claim 29 in which the trialkylamine is triethylamine.

31. A nonaqueous noncorrosive inorganic salt free soft solder paste as defined in claim 2 in which the flux is an alkali metal hydroxide or an alkali metal alcoholate.

32. A nonaqueous noncorrosive inorganic salt free soft solder paste as defined in claim 31 in which the alkali metal hydroxide is dissolved in or reacted with the polyol.

33. A nonaqueous noncorrosive inorganic salt free soft solder paste as defined in claim 31 in which the alkali metal hydroxide is sodium hydroxide.

34. A nonaqueous noncorrosive inorganic salt free soft solder paste as defined in claim 2 in which the nonaqueous organic liquid is a polyhydric alcohol containing only the elements C, H, and O.

35. A nonaqueous noncorrosive inorganic salt free soft solder paste as defined in claim 34 in which the polyhydric alcohol is glycerine.

36. A nonaqueous noncorrosive inorganic salt free soft solder paste as defined in claim 2 said paste being further characterized by the presence therein of from 0.5% to 10% by weight of an alkanolamine.

37. A nonaqueous noncorrosive inorganic salt free soft solder paste as defined in claim 36 wherein the alkanolamine is triethanolamine.

38. The paste of claim 2 comprising from about 75–95 parts of powdered tin-containing solder which melts below 330° C. and has particle size not substantially larger than about 100 mesh.

* * * * *